(12) United States Patent
Chenin

(10) Patent No.: US 7,404,695 B2
(45) Date of Patent: Jul. 29, 2008

(54) SEAFLOOR-SURFACE CONNECTING INSTALLATION OF A SUBMARINE PIPELINE INSTALLED AT GREAT DEPTH

(75) Inventor: Laurent Chenin, Le Mesnil Saint Denis (FR)

(73) Assignee: Saipem S.A., Montigny le Bretonneux (FR)

( * ) Notice: Subject to any disclaimer, the term of this patent is extended or adjusted under 35 U.S.C. 154(b) by 792 days.

(21) Appl. No.: 10/468,177

(22) PCT Filed: Feb. 18, 2002

(86) PCT No.: PCT/FR02/00608

§ 371 (c)(1),
(2), (4) Date: Sep. 18, 2004

(87) PCT Pub. No.: WO02/066786

PCT Pub. Date: Aug. 29, 2002

(65) Prior Publication Data

US 2004/0218981 A1 Nov. 4, 2004

(30) Foreign Application Priority Data

Feb. 19, 2001 (FR) .................................... 01 02206

(51) Int. Cl.
*E21B 17/02* (2006.01)
(52) U.S. Cl. ................................................. 405/224.3
(58) Field of Classification Search ................. 405/224, 405/224.2, 169, 172, 224.3; 166/345, 359, 166/367
See application file for complete search history.

(56) References Cited

U.S. PATENT DOCUMENTS

| 3,690,112 | A | * | 9/1972 | Pattison et al. ............... 405/169 |
| 4,023,517 | A | * | 5/1977 | Ryan ...................... 114/230.13 |
| 4,031,919 | A | | 6/1977 | Ortloff et al. |
| 4,100,752 | A | * | 7/1978 | Tucker ........................ 405/170 |
| 4,199,275 | A | | 4/1980 | Tuson |
| 4,878,694 | A | | 11/1989 | Castel |
| 6,082,391 | A | | 7/2000 | Thiebaud et al. |
| 6,321,844 | B1 | | 11/2001 | Thiebaud et al. |

FOREIGN PATENT DOCUMENTS

FR 2 396 154 7/1977

(Continued)

*Primary Examiner*—Sunil Singh
(74) *Attorney, Agent, or Firm*—Cohen Pontani Lieberman & Pavane LLP

(57) ABSTRACT

The invention concerns a seafloor-surface connecting installation for a submarine pipeline (10) set on the seafloor, in particular at great depth, of the hybrid-tower type comprising a static base (13-18) set on the seabed. In the inventive installation: 1) said vertical riser includes a terminal pipe portion ($5_1$), and a flexible joint (19) which allows angular movements ($\alpha$) of the upper part ($5_2$) relative to said terminal pipe portion ($5_1$); and 2) the terminal part (11) of said pipe resting on the seabed has a an elbow-type terminal curvature; 3) said terminal portion ($5_1$) of the vertical riser is connected to said terminal curvature (11) by a single connecting element; and 4) said base plate (13-18) rigidly maintains in fixed vertical position and linked to each other via said connecting element (12): said terminal pipe portion ($5_1$) and said elbow-type terminal curvature (12) the latter facing upwards.

22 Claims, 11 Drawing Sheets

FOREIGN PATENT DOCUMENTS

| | | |
|---|---|---|
| FR | 2 507 672 | 12/1982 |
| FR | 2 600 709 | 6/1986 |
| FR | 2 768 457 | 9/1997 |
| FR | 2 809 136 | 5/2000 |
| GB | 2 103 570 A | 2/1983 |
| WO | WO 00/49267 | 8/2000 |

* cited by examiner

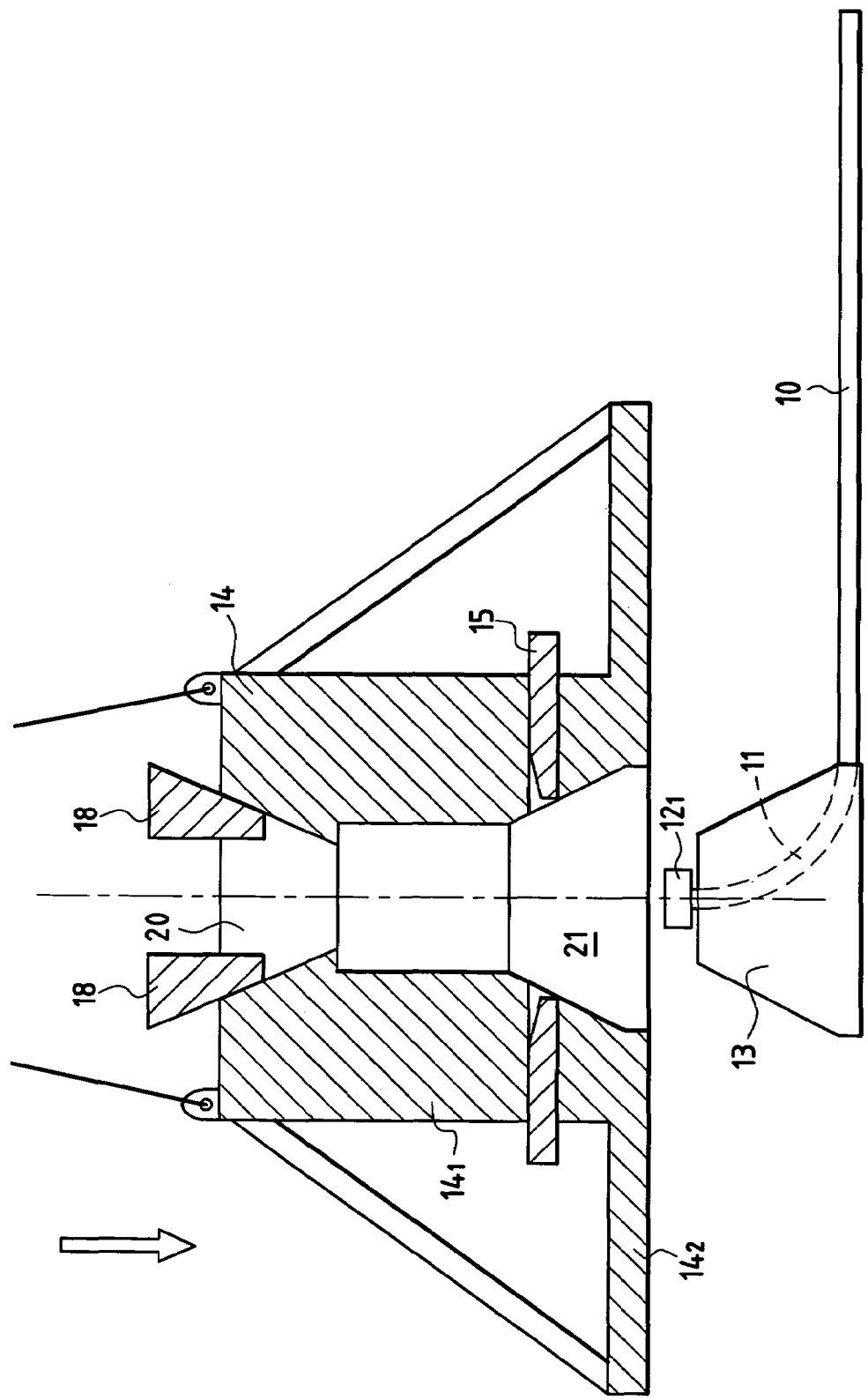

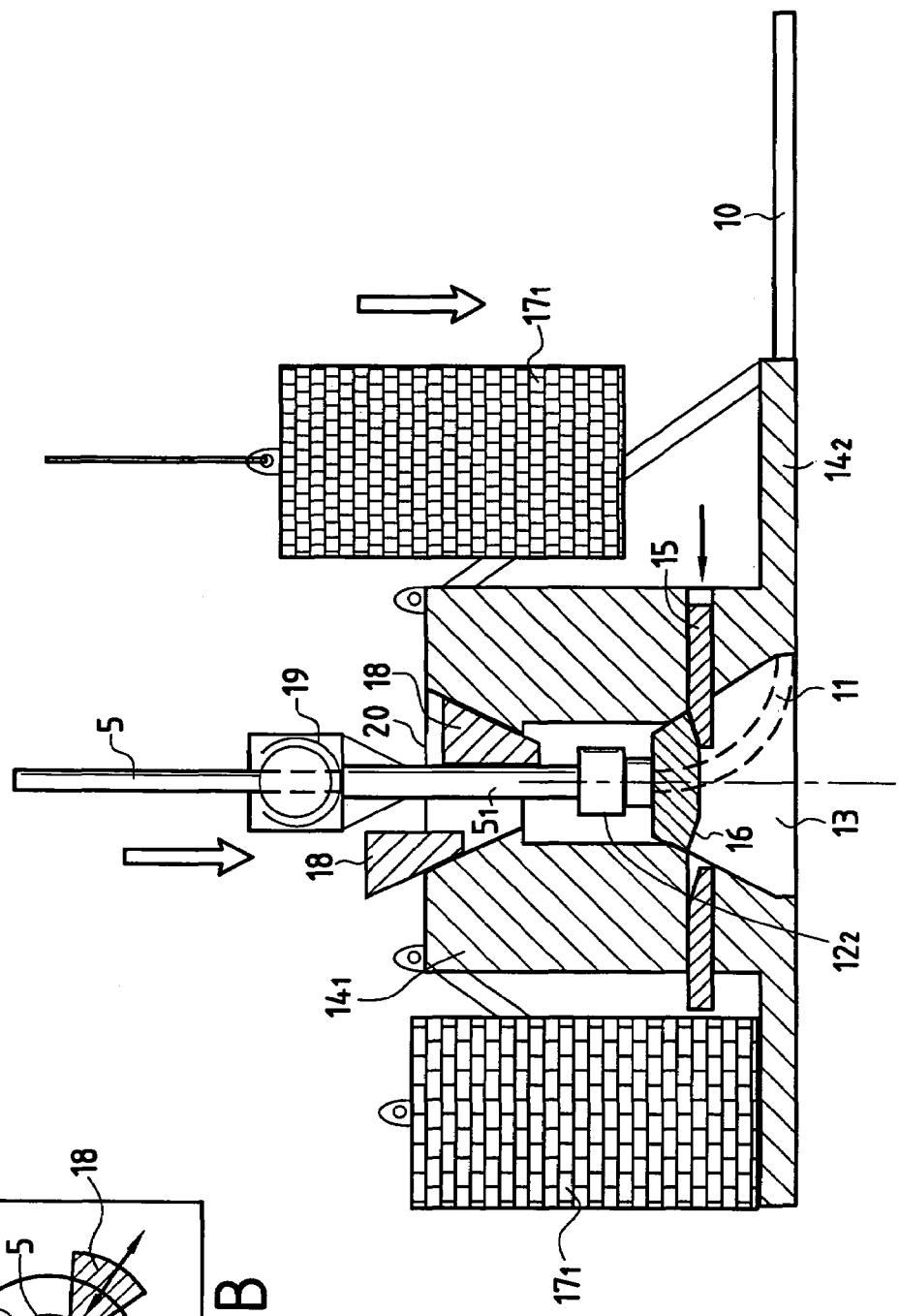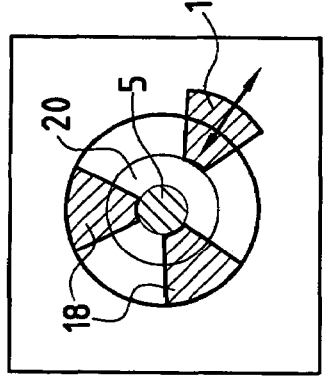

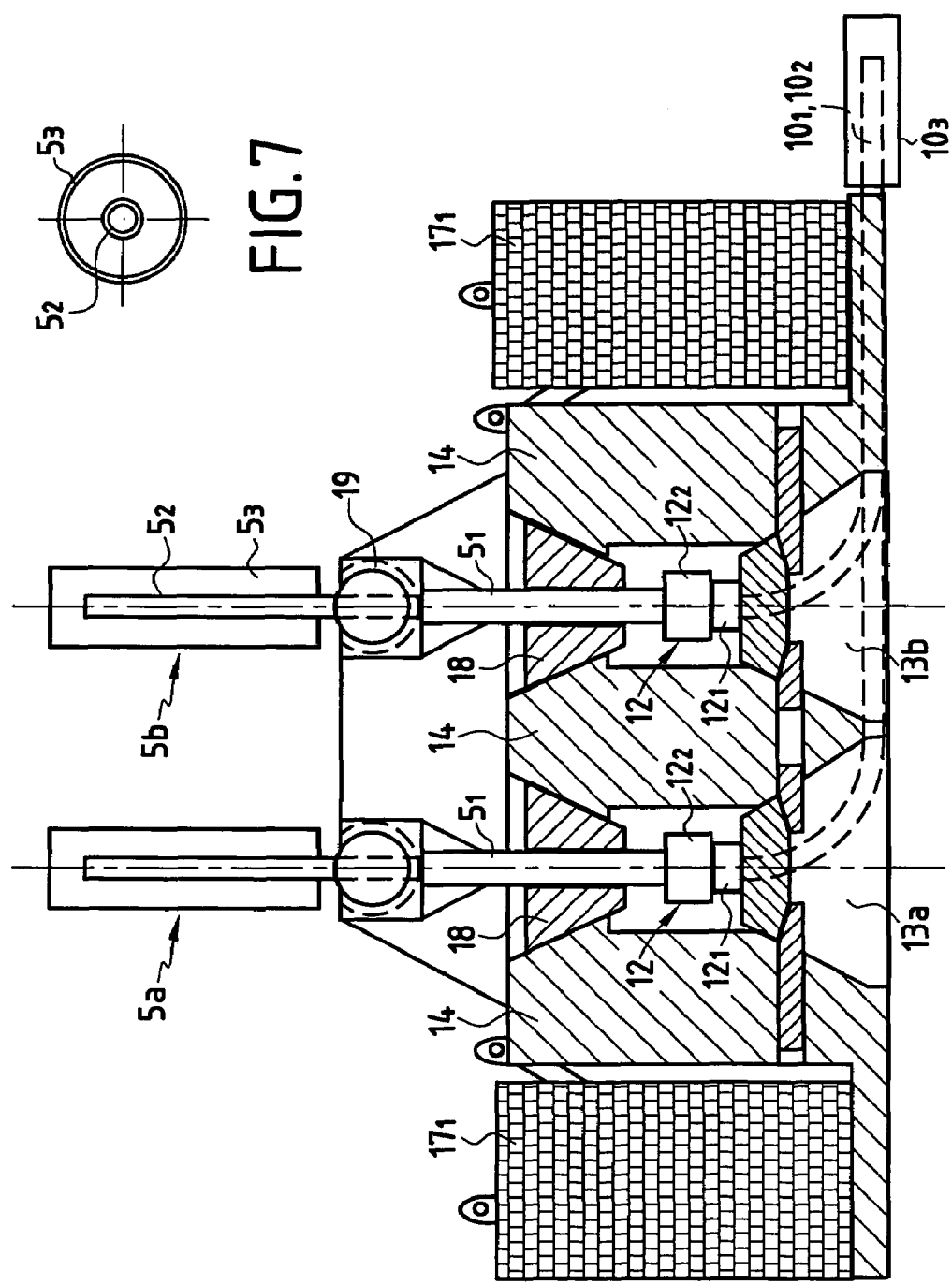

SEAFLOOR-SURFACE CONNECTING INSTALLATION OF A SUBMARINE PIPELINE INSTALLED AT GREAT DEPTH

PRIORITY CLAIM

This is a U.S. national stage of application No. PCT/FR02/00608, filed on Feb. 18. 2002. Priority is claimed on that application and on the following application: Country: France, Application No.: 01/02206, Filed: 19 Feb. 2001.

BACKGROUND OF THE INVENTION

1. Field of the Invention

The object of the present invention is a seafloor—surface connection installation of at least one sub-marine hybrid tower pipeline installed at great depth.

The technical field of the invention is the field of manufacturing and installation of production vertical risers for sub-marine extraction of petroleum, gas or other soluble or fusible material or of a suspension of mineral material using an immersed well head for the development of production fields installed on the open sea, offshore. The main and immediate application of the invention being in the field of petroleum production.

A floating base comprises in general anchoring means for remaining in position regardless of the currents, winds and the swell. In general, it comprises also petroleum storage and processing means as well as offloading means to the oil-tank carriers, these latter appearing at regular intervals in order to carry out removal of production. In English these floating bases are called "Floating Production Storage Offloading", for which the abbreviated form FPSO will be used throughout the following description.

By reason of the multiplicity of the lines existing on this type of installation, seafloor—surface hybrid type vertical riser type connections have been deployed in which the substantially vertical rigid pipelines called herein 'vertical risers', assure the connection between the sub-marine pipelines resting on the seafloor and rise along a riser up to a depth in proximity to the surface, at which depth the flexible pipelines assure the connection between the top of the tower and the floating base. The tower is thus equipped flotation mans in order to remain in a vertical position and the risers are connected at the foot of the tower to the sub-marine pipelines by flexible sleeves that absorb the angular movements of the tower. The assembly is collectively called a 'hybrid tower', because it combines two technologies: on the one hand a vertical part, the tower, in which the riser is comprised of rigid pipelines and on the other hand the top part of the riser comprised of concatenated flexible pipes that assure the connection to the floating base.

2. Discussion of Related Art

French patent FR 2 507 672 published on 17 Dec. 1982 entitled "Riser for Great Water Depths" is well-known and describes such a hybrid column.

The present invention relates more particularly to the known field of connection of the type comprising a hybrid vertical column anchored on the seafloor and comprised of a float disposed at the top of a vertical riser, the latter being connected by a pipeline, especially a flexible pipeline assuming by its own weight the form of a catenary from the top of the riser up to a floating base installed on the surface.

The interest in such a hybrid column resides in the possibility for the floating base to be able to leave its normal position by inducing a minimum of stress in the column as well as in the parts of the pipelines in the form of suspended catenaries, both on the seafloor and on the surface.

The patent filed on behalf of this applicant, WO 00/49267, is well known and discloses a column whose float is at a depth greater than the half-depth of the water and whose catenary connection to the surface craft is realized by means of thick-walled rigid pipelines. The column thus described requires at its base flexible link pipes enabling connecting the lower end of the vertical risers of said column to the sub-marine pipeline resting on the bottom in such a fashion as to absorb the movements resulting from dilations due to the temperature of the fluid being transported.

More particularly, in WO 00/049267, the anchoring system comprises a vertical tendon comprised of either a cable or a metal bar or even of a pipeline held at its upper end by a float. The lower end of the tendon is fixed to a foot resting on the seafloor. Said tendon comprises guide means disposed over its entire length through which said vertical risers pass. Said foot can be positioned simply on the seafloor and remain in place in virtue of its own weight or it can be anchored by means of piles or any other suitable device for maintaining it in place. In WO 00/42967 the lower end of the vertical riser can be connected to the end of a curved connection sleeve moveable between a high and a low position relative to said foot from which this connection sleeve is suspended and associated with a return means moving it into the high position in the absence of the riser. This mobility of the bent connection sleeve makes it possible to accommodate variations in the length of the riser under the effects of temperature and pressure. An abutment device is secured at the top of the vertical riser in suspension on the support guide installed on the top of the float.

Furthermore, the crude petroleum traveling over very long distances—several kilometers—it should be provided with an extreme insulation level in order on the one hand to minimize the increase in viscosity that would lead to a reduction of the hourly production of the wells and on the other hand to prevent blockage of the flow by deposition of paraffins or the formation of hydrates once the temperature decreases to around 30-40° C. These latter phenomena are even the more critical, in particular in West Africa, as the temperature of the sea bottom is of the order of 4° C. and the crude petroleum are of the paraffin type.

Numerous thermal insulation systems are known that make it possible to achieve the required performance level and to resist the pressure at the bottom of the sea which is of the order of 150 bar at 1,500 m depth. The "pipe-in-pipe" concepts can be cited inter alia that comprise a pipe carrying hot fluid installed within a protective external pipe, the space between the two pipes being either simply filled with a heat insulating material, whether or not confined under vacuum, or simple evacuated. Numerous other materials have been developed for assuring high performance insulation; certain of these being resistant to pressure, simply surrounding the hot pipeline and are in general confined to the inside of a flexible or rigid envelope under equipressure and whose main function is to maintain a substantially constant geometry over time.

All of these devices carrying a hot fluid within an insulated pipe exhibit, to different degrees, the phenomenon of differential dilation. In fact, the inside pipe, generally made of steel, is at a temperature that should be maintained as high as possible; for example 60 or 80° C., since the outer envelope, which is quite frequently also made of steel, is at the temperature of the seawater; that is, around 4° C. The forces acting on the connection elements between the inside pipe and the outer envelope are considerable and can reach several tens, even several hundreds of tons and the overall resulting elongation is of the order of 1 to 2 m in the case of insulated pipelines of 1,000 to 1,200 m in length.

OBJECTS AND SUMMARY OF THE INVENTION

The object proposed according to the present invention is to be able to realize and install such bottom—surface links for sub-marine pipelines at great depths, such as greater than 1,000 meters, for example, and of a type comprising a vertical tower and in which the transported fluid must be maintained above a minimal temperature until its arrival at the surface, by reducing to a minimum the components subject to heat loss, by preventing the drawbacks created by thermal expansion itself or different of the various components of said tower in such a fashion as to resist extreme stresses and the fatigue phenomena accumulated over the life span of the work, which currently exceeds 20 years.

Another object of the present invention is to provide a bottom—surface link installation of the hybrid tower type, whose anchoring system is high strength and inexpensive and wherein the installation process of the various constituent elements is simplified and likewise inexpensive.

Another object based on the present invention is to provide an installation that makes it possible to service the interior of the sub-marine pipeline resting on the sea floor using a process of the coil-tubing type from the surface and utilizing the top end of the vertical riser.

A solution to the proposed objects is thus an installation of bottom—surface link for sub-marine pipelines resting on the seafloor, in particular at great depth, comprising:

a) at least one vertical riser connected at its bottom extremity to at least one sub-marine pipeline resting on the sea bottom and having at its top extremity at least one float, and b) at least one connecting pipe, preferably a flexible pipe, assuring the connection between a floating support and the upper extremity of said vertical riser, and c) the connection between the lower extremity of said vertical riser and a so-called sub-marine pipe resting on the sea bottom is provided by means of an anchoring system comprising a foot positioned on the bottom and remaining in place especially by its own weight or by means of suction anchors;

characterized in that:

1. said vertical riser comprises at its lower extremity a portion of terminal pipe, preferably reinforced, connected to the upper part of said vertical riser by a flexible joint which allows angular movements ($\alpha$) of said upper part relative to said portion of the terminal pipe;

2. the terminal part of said pipeline resting on the sea bottom has an terminal curvature in the shape of an elbow, preferably with a large radius of curvature;

3. the lower extremity of said terminal portion of the vertical riser is connected to the upper extremity of said elbow shaped terminal curvature of the sub-marine pipeline resting on the sea bottom by a single connecting element between said vertical riser and said sub-marine pipeline resting on the bottom, preferably an automatic connector, and 4. said foot rigidly maintains in fixed vertical position and connected one to another by means of said connecting element:

on the one hand, said terminal elbow shaped pipe of said vertical riser on the other hand, said terminal elbow shaped curvature of said sub-marine pipeline resting on the bottom, the latter being turned facing upwards.

The installation according to the present invention is advantageous, because it has a static geometry of the lower part of the tower and it is thus completely stabilized and does not bear any movement and/or force, especially at connection between the vertical riser and the pipe resting on the sea bottom.

A further advantage of the present invention- is also the considerable reduction of the overall cost resulting from the suppression of the connection sleeves used in the prior art for connecting the vertical riser and the pipe resting at sea level. In fact, such a connection sleeve, according the prior art, is complex to manufacture and install, because it is installed after lowering to the bottom of the extremity of the pipe resting on the sea bottom and after installation of the foot, which is done in a target zone each generally representing, respectively, a circle of approximately 5 to 10 meters in diameter; that is, with a considerable uncertainty as to their relative position. Metrology of the position and relative orientation of the extremities of the lines should be done then using a ROV ("remote operated vehicle," meaning an automatic sub-marine remote controlled from the surface). The connection sleeve is then realized either on the mainland or on board the installation vessel, then put into place using a ROV. In addition, such a connection sleeve requires connecting means, generally two automatic connectors, one at each end of the connection sleeve, between the vertical riser and the pipe resting on the sea bottom. Finally, it must be stated that the effective thermal insulation of such a bent connection sleeve equipped with its automatic connectors used in the prior art is extremely complicated to produce and is therefore very expensive, which accordingly considerably increases the cost and the complexity of the installation in the case, wherein it is implemented under conditions requiring extreme insulation.

Finally, because the extremities of the pipe resting on the bottom are lowered into the target zones and distanced from the base of the tower, it is necessary to install prefabricated connection sleeves having a succession of linear and variable angular bent parts for connecting the extremity of the pipe resting on the bottom to the base of the tower, which creates considerable forces—by the pressure and the movement created by the dilation of the pipe resting on the bottom—in said connection sleeves, giving rise principally to flexion stresses due to the existence of said bends themselves.

The installation according to the invention makes it possible to eliminate all of these drawbacks of the prior art and to more cost effectively provide a riser tower incorporating the best performance insulation technologies.

According to WO 00/49267, the tower comprising several risers is suspended by a central tendon that holds a plurality of vertical risers in suspension and the top of the tendon held by a float constitutes a point of reference substantially fixed at altitude at the variation close to the overall apparent weight of the risers and their contents; and the integrality of displacement was thus accommodated by the bend connection sleeves on the lower part, expensive parts and difficult to produce and install. According to the present invention, the substantially elevated fixed point is situated below the tower at the level of the flexible joint, which makes it possible to eliminate the bent connection sleeves, the differential movements between the risers being accommodated by the different floats that are free to displace vertically at the top of each of said risers.

In one advantageous embodiment, said foot comprises:

a) a lower structure positioned on the bottom that maintains said terminal elbow of said pipe in vertical position turned upwards and a first part of said connection element at the extremity of said bend, and b) an upper structure that assures guidance of said terminal part of said vertical riser and that holds it in the vertical position and that cooperates with said lower structure such that said upper structure is positioned over said lower structure, so as to:
  guide a second part of said connection element situated at the lower extremity of said terminal part of said vertical riser relative to said first complementary part of said second part of said connection element, and
  stabilize said lower structure positioned on the bottom by the weight of said upper structure and, eventually, in cooperation with suction anchors.

This embodiment described above makes it possible in effect to facilitate connection of the vertical riser and the sub-marine pipe resting on the bottom when the installation is put into place.

Preferably, said lower structure is secured to said upper structure by a system of wedges, which prevents any subsidence of said lower structure into the sea floor.

More particularly, said upper structure comprises:
  a main structure and stabilization elements that cooperate with said main structure for stabilizing it on the sea bottom;
  a central elevated structure comprising:
  an interior cavity open at its base and having a form complementary to the external form of said lower structure such that said central structure caps said lower structure, and
  an upper opening crossed by said terminal portion of said vertical riser, which latter being blocked in said opening by a second wedge system, said opening communicating with said interior cavity, and
  a lower peripheral horizontal platform at the base of said central structure with which said stabilization elements cooperate, in particular on which the anchor block or across which the suction anchors are imbedded in the floor.

The present invention is particularly advantageous if the installation comprises:
  at least two said vertical risers substantially parallel and in proximity, each being connected at its upper extremity to at least one float, and
  said foot holding [them] in vertical fixed position and connected to each other by means of said connection elements:
  on the one hand, two said portions of the terminal pipes of said vertical risers and
  on the other hand, respectively, two so-called terminal elbow bends of two so-called sub-marine pipelines resting on the bottom, these latter being turned upwards.

In this embodiment with a plurality of risers, said foot comprises:
  at least two so-called lower structures positioned on the bottom, each holding in vertical position turned upwards one so-called terminal bend of one so-called sub-marine pipe resting on the sea bottom and one so-called first part of a so-called connection element at the extremity of said bend, and
  one so-called upper structure that assures guidance of the two so-called terminal portions of said vertical risers and holding them in vertical position and which,-cooperates with the two so-called lower structures such that said upper structure is positioned above at least two so-called lower structures side-by-side in such a fashion as to guide one so-called second part of said connection element situated at the lower extremity of said terminal portion of each of said vertical risers relative to said first part of said connection element at the extremity of said bend of each of said conduits resting on the bottom by the weight of said upper structure and eventually by cooperating with the suction anchors.

In one particular embodiment, said upper structure comprises a main structure comprising at least two interior cavities, each one of a form complementary to the external form of on so-called lower structure and capping it and at least two so-called upper openings, each communicating with one so-called interior cavity, each of said upper openings being crossed by one so-called terminal portion of said vertical risers, these later being blocked in said upper opening by a so-called second system of wedges.

Advantageously, said main structure comprises:
  at least two elevated central structures cooperating with a second horizontal platform on which at least the two so-called lower structures rest;
  said second platform being surmounted by a central vertical element that makes possible:
  guiding of said vertical risers relative to said upper openings of each of said elevated central structures, and
  preferably also the blocking of the two so-called elevated structures using a wedge system.

The installation according to the invention is more particularly still advantageous if:
  the two so-called sub-marine pipelines resting on the sea floor are assembled in a bundle in the same flexible protective envelope making it possible to contain an insulating material, preferably a phase change of the paraffin type or a gel insulating compound, surrounding said pipes and
  said vertical riser comprises in its upper part above said flexible joint a system of insulated pipes comprised of an assembly of two coaxial pipes comprising an internal pipe and an external pipe, an insulating fluid or material, preferably a phase change material of the paraffin type or a gel compound being placed preferably between the two so-called pipes or even by maintaining a forced vacuum between these latter.

In one preferred embodiment for facilitating the differential movements between risers, a first and a second vertical riser are maintained substantially parallel by means of a sliding connecting system allowing axial displacements of said first riser relative to said second riser, said connecting system comprising a tubular collar fixed around said first riser, said collar being rigidly connected to a tubular ring sliding freely around said second riser, preferably a plurality of so-called collars of the same sliding connecting system being disposed along each of said risers alternatingly with said rings of another so-called connecting system on the same so-called riser. This sliding connecting system makes it possible for the risers to move vertically but not transversely; that is, they remain substantially equally spaced in a plane perpendicular to their axes.

The junctions between the different components of the float assembly, flexible pipeline and vertical riser being situated not far from the surface are subjected to the combined effects of swell and current. In addition, the surface support being subjected not only to swell and current but also to the effects of wind, the movements of the assembly create at the singular point that constitutes the junction between the riser and flexible pipeline, considerable forces in the various mechanical constituents. In fact, the float exerts a vertical traction upwards that can vary by several tens of tons to several hundreds of tons even exceeding 1,000 tons, depending on the depth of the water that can reach 1,500 m or even 3,000 m and according to the inside diameter of the pipe that can vary from 6" to 14" or even 16". Thus, the forces to be transmitted are considerable and the movements of the assembly are cadenced, inter alia, to the rhythm of the swell; in other words, with a typical variant period, in rough period between 8 and 20 seconds. The accumulated fatigue cycles over the life span of the field thus reaching values exceeding several tens of millions of cycles. That is why an installation according to the invention advantageously comprises at least one float, preferably a group comprising a plurality of floats installed at the top of each, at least two so-called vertical risers, disposed in such a fashion that said floats are held secured by means of a structure supporting them and allowing vertical displacements relative to each of said float groups relative to each other, in particular displacement caused by differential dilation. Said floats are thus free to move vertically but thy are sufficiently spaced so that, at the mercy of deformation of their carrying structures, any physical contact between groups of floats is prevented.

Another object of the present invention is to make possible facilitated intervention to the interior of said riser from the surface, in particular to enable inspection or cleaning of said vertical riser, by the introduction of a rigid tube from the upper extremity of the float, passing through said connecting device between the float and the vertical riser.

In fact, these bottom—surface connections transport a polyphasic fluid; in other words, a fluid comprised of crude petroleum, water and gas. When the fluid rises, the local pressure falls and the gas bubbles thus increase in volume, creating phenomena of instability of the fluid vein that can result in significant surges. At production stoppages, the gas is situated in the upper part and the oil-water mixture is trapped in the lower parts; that is, in the lower part of the catenary flexible pipe zone, as well as in the lower part of the substantially vertical section of the riser.

The polyphasic mixture, made up of crude petroleum, water and gas has a tendency, when the temperature falls below a level situated between 30 and 40° C., to create two types of plug that risk blocking production. A first type of plug is due to the formation of hydrates from the gas phase in the presence of water; another type is due to setting of the paraffin contained in variable proportion in the crude petroleum of certain oil fields, particularly in West Africa.

The so-called "coiled tubing" service method is known for the interior of the pipelines that consists of urging a rigid tube having a small diameter, generally 20 to 50 mm, through the pipe. Said rigid tube is stored wound up by simple wrapping around a reel, then untwisted at the time of unwinding. Said tube can measure several thousands of meters in one single length. The end of the tube situated on the drum storage reel is connected by a rotating joint to a pumping device that is capable of injecting a liquid under high pressure and temperature. Thus, by urging the end of the tube through the pipeline, while maintaining pumping and counter-pressure, the concerned pipeline is cleaned in virtue of the injection of a hot product capable of dissolving the plugs. This service method is currently used in servicing vertical wells or in pipes obstructed by the formations of paraffins or hydrates, phenomena that are current and dreaded in all crude petroleum production installations. The coiled tubing method is called 'continuous tubing cleaning' or NTC in the following.

The installation according to the invention comprises a linking device between said float and the upper extremity of said riser, comprising:

a second flexible pipe whose extremities are incorporated at the respective level of said float and the upper extremity of the riser;

linking of said second a second flexible pipe at the upper extremity of said riser to the upper extremity of said riser being formed by means of a gooseneck device, which gooseneck device assures also the connection between said riser and a so-called linking pipe with the floating support, preferably a so-called flexible pipe;

said second flexible conduit being preferably extended through said float by a rigid tubular channel passing through the float from one side to the other in such a fashion that service can be done at the interior of said vertical riser from the upper part of the float through said rigid tubular channel, then said lining device comprised of said second flexible pipe is through said gooseneck device in such a fashion as to access the interior of said riser and clean it by injection of liquid and/or scraping of the inside wall of said riser of said sub-marine pipeline resting on the sea floor.

The gooseneck device comprises an upper straight linear part that assures the junction between said vertical riser and said second flexible pipe connected to said float. A curved part in the shape of an elbow disposed on this so-called straight linear part of the gooseneck device makes possible the junction between the extremity of said vertical riser and the extremity of said flexible pipe itself connected to said floating support. The extremities of said curved part being substantially tangent to the curve of the catenary comprised of said flexible pipe that assures the linking to the floating support and substantially tangent to said straight linear part of the gooseneck device.

A further advantage of the installation according to the invention is that all of the elements can be prefabricated on the mainland prior to being installed. They can thus be assembled in mock in order to verify that all of the elements cooperate correctly, including the screw means; thus, assembly of the installation is considerably simplified and the operational time of the installation vessels is reduced to a minimum. In the prior art, the sub-marine pipelines were positioned and then, after installation of the risers, the elbow connection sleeves were fabricated on the basis of high-precision metrology using ROVs. The connection sleeve, prefabricated on the mainland or on site can measure several tens of meters and must them be installed using the same ROV, which represents a considerable operational time and consequently very high costs due to the sophistication of the specialized installation vessels. The gain realized by the device and the process according to the invention, works out to several days of installation vessel as well as to the elimination of the indispensable automatic connectors at each end of the prefabricated connection sleeve, which represents a considerable reduction in costs.

The objects of the present invention are thus similarly achieved by a method for implementing an installation that comprises the steps, wherein:

at least one so-called sub-marine pipeline, whose terminal part has a so-called elbow turned facing upward and stabilizing it on the sea floor, is installed on the sea floor and a so-called foot is lowered that maintains said elbow bend in place and stabilizes it on the sea floor, and at least one so-called vertical riser is lowered through an opening in said foot, the lower extremity of said riser comprising a so-called second complementary part of a so-called connection element, in particular male or female, respectively, in such a fashion as to realize said connection between the two so-called first and second complementary parts of said connection element, and the blockage in said foot of said lower terminal part of said riser ($5_1$) and said terminal part of pipeline resting on the sea floor having a so-called elbow-type bend.

More particularly, the method according to the invention-comprises the steps, wherein:

1- at least on so-called sub-marine pipeline is installed on the sea bottom, the terminal part of which has an elbow-type bend secured to a so-called lower structure, preferably previously installed at the surface, and 2- a so-called upper structure is lowered over said lower structure and said lower structure is blocked mechanically, preferably still by means of a system of wedges, at the interior of said cavity of said upper structure, and 3- said upper structure is stabilized by the cooperation of said stabilization elements with the bottom from above a so-called base platform of said upper structure resting on the bottom, in particular by lowering of the anchorage base onto said platform or by imbedding the suction anchors through an opening in said platform;

4- at least one so-called vertical riser is lowered through at least one so-called upper opening of said upper structure, then 5- after approximation of the complementary parts of said connection element, said connection is made, and 6- blockage of said portion of the terminal pipe at the lower extremity of said vertical riser is done between said connection element and said flexible joint in said upper opening using a system of wedges.

In a preferred embodiment, the blockage of said lower structure using a system of wedges detailed above at step 2 is done at the end; that is, after the final step 6.

BRIEF DESCRIPTION OF THE DRAWINGS

Other features and advantages of the present invention will become apparent in the light of the detailed explanation of the embodiments that follows with reference to the attached FIGS. 1 to 12.

FIG. 2 represents a view of the lower part of the installation according to the invention prior to connection of the lower extremity of the vertical riser with said sub-marine pipeline resting on the sea floor.

FIG. 3A represents a side view of the lower part of the installation according to the present invention after connection of the vertical riser and prior to blockage in the foot.

FIG. 3B represents a view from above of the system of wedges used in centering blocking of the vertical riser in the foot.

In FIG. 5A, the cross-section corresponds to a section along the axis AA of FIG. 5B.

FIG. 6 is a side sectional view of the lower part of the installation according to the invention, comprising two vertical risers installed in parallel and connected at their bas to two sub-marine pipelines resting on the sea floor, assembled in a bundle.

FIG. 7 is a cross-section view representing the sections of an internal pipe and an external pipe of a vertical riser insulated by pipe-in-pipe assembly.

FIG. 8 represents a cross-section view of a section of a bundle of sub-marine two pipes resting on the sea floor.

DETAILED DESCRIPTION OF THE PRESENTLY PREFERRED EMBODIMENTS

Figure 1:
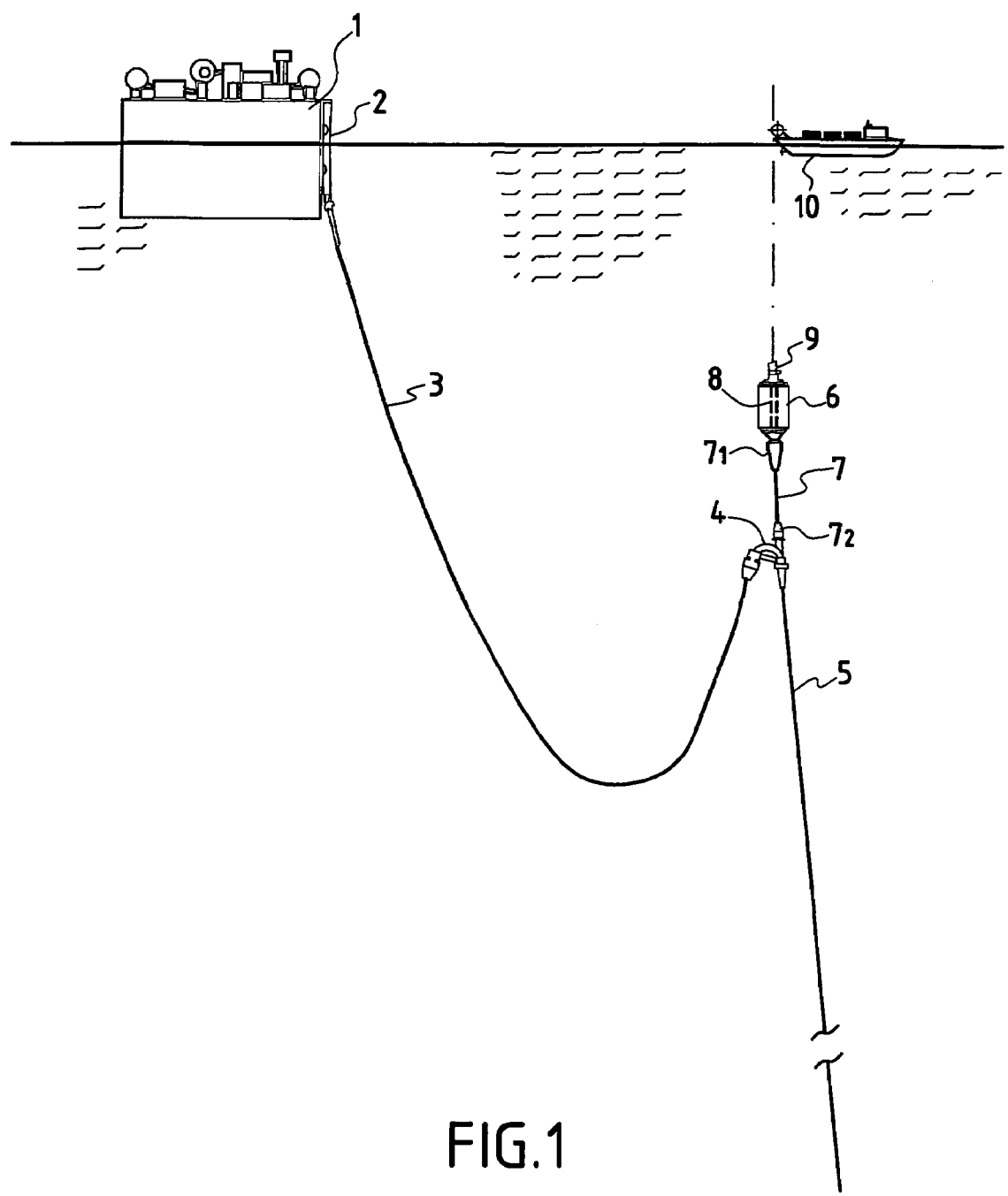
FIG. 1 represents a view in section of the upper part of a hybrid tower connected to a FPSO type floating support with a vessel 10 performing a service operation on the vertical of said tower.

FIG. 1 represents a bottom-to-surface connection for an sub-marine pipeline 10 resting on the sea bottom, in particular at great depth, comprising:

a) at least one vertical riser 5 connected at its lower extremity to at least one sub-marine pipeline 10 resting on the sea bottom (not shown) and at its upper extremity to at least one float 6, and b) at least one connection pipeline, preferably a flexible pipeline, assuring the connection between a floating support 1 and an upper extremity 4 of said vertical riser.

The FPSO 1 is anchored over an oil field at 1,500 m depth by an anchoring system (not shown) and comprises at its side a supporting system 2 of flexible pipelines 3 for petroleum effluents 3 configured as a catenary rising towards a gooseneck device 4, itself secured at its upper extremity to a vertical riser 5. The assembly is maintained under tension by said float 6 installed at the head of the vertical riser 5 by means of a flexible pipe 7 for opening onto a closed opening by a valve 9. A service vessel 10 situated vertical to said float can carry out a maintenance operation by coil tubing through the float 6 in such a fashion as to force into the vertical part of the pipeline a small diameter rigid pipe (not shown)—generally 50 mm—for cleaning the interior of the pipeline along its progression. The coil tubing devices being known to the specialist in the field of petroleum well service are not developed in greater detail herein.

Figure 4:
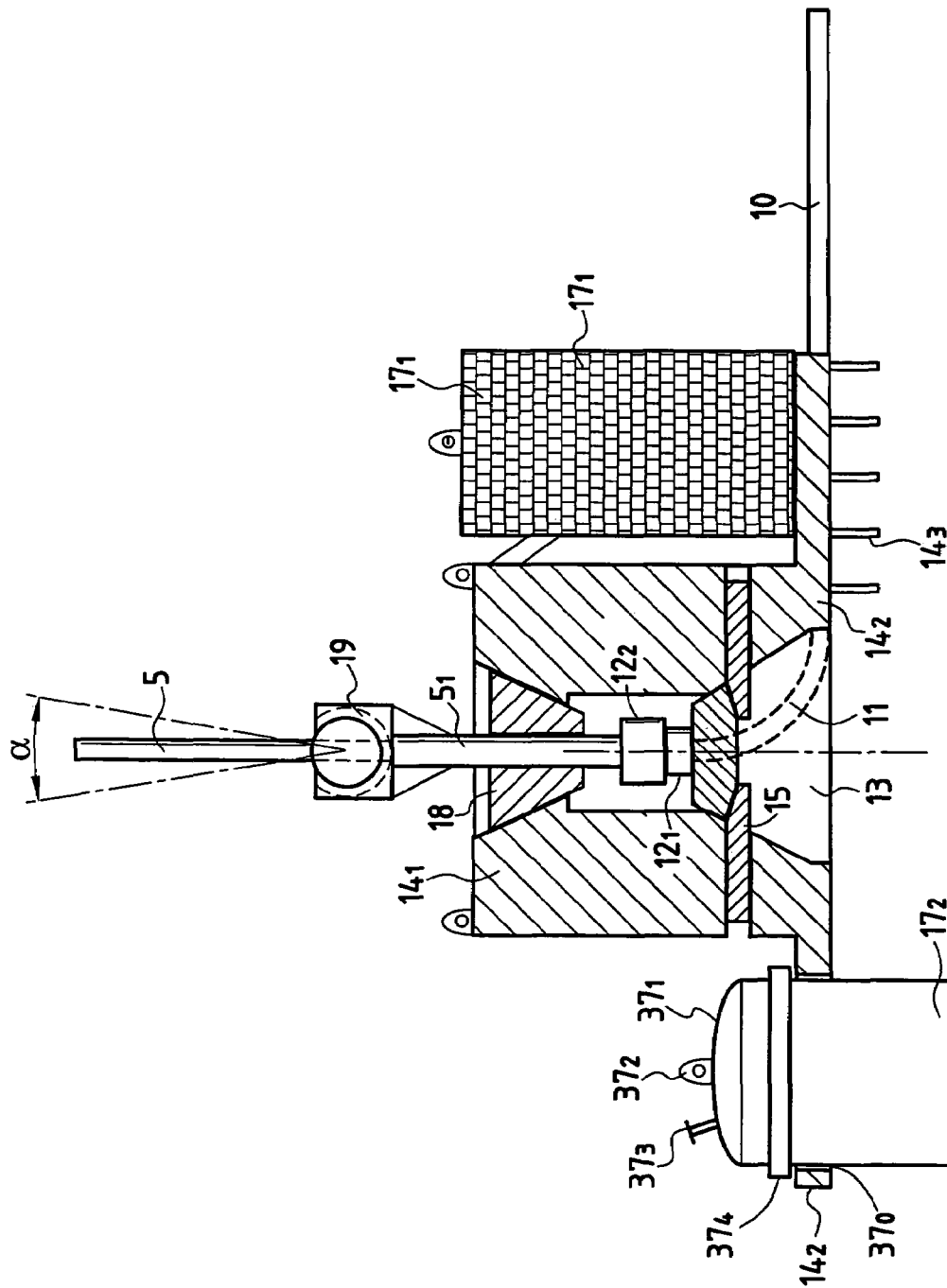
FIG. 4 is a view in section of the lower part of the installation according to the invention, after blocking—centering of the riser in the foot and showing possible angular movements of the upper part of the vertical riser as well as an anchorage block and a suction anchor.

FIGS. 3A and 4 represent the connection between the lower extremity of said vertical riser and a so-called sub-marine pipeline 10 resting on the sea bottom by means of an anchoring system comprising a foot 13-14 positioned on the bottom and remaining in place in virtue of its own weight.

Said vertical riser comprises at its lower extremity a terminal pipe portion $5_1$, preferably reinforced, connected to the upper part $5_2$ of said vertical riser by a flexible joint 19, which allows angular movements α of said upper part $5_2$ relative to said terminal pipe portion $5_1$.

The flexible joint 19 allows a significant variation in the angle a between the axis of the tower and the axis of the part of the vertical riser secured to the foot without giving rise to significant stresses in the portions of the pipeline situated on either side of said flexible joint. This flexible joint can be, in known fashion, either a spherical ball with leakproof joints or a laminated ball comprised of sandwiches of elastomer sheets and adhered metal sheets capable of accommodating the significant angular displacements by deformation of the elastomers, whilst conserving complete leak tightness due to the absence of friction joints, or even a limited length of flexible pipeline capable of providing the same service. In all cases, it is understood that the so-called flexible joint 19 is hollow and its inside diameter is substantially of the same diameter as the adjacent pipes comprising said vertical riser 5 in such a fashion as not to interfere with and to facilitate the passage of scraping tools or coil tubing servicing.

Said terminal part 11 of the pipeline resting on the sea floor has an elbow-type bend, preferably with a large radius of curvature, in particular a radius of curvature of greater than 5 meters and more particularly of the order of 5 to 10 meters. According to the present invention, an "elbow" is defined as two short rectilinear sections of pipe disposed at 90° to each other, separated and connected between each other by a curved section having said radius of curvature.

The lower extremity of said terminal portion $5_1$ of the vertical riser is connected to the upper extremity of said terminal curvature 11 of the sub-marine pipeline resting on the bottom by a single connection element 12 between said vertical riser and said sub-marine pipeline resting on the bottom 10, preferably an automatic connector.

Said foot 13-14 rigidly maintains in the vertical position and connected to each other by means of said connection element 12:
  on the one hand said portion of the terminal pipe $5_1$ of said vertical riser and
  on the other hand said elbow-type terminal bend 11 of said sub-marine pipeline resting on the bottom, which latter is turned facing upwards.

According to FIG. 2, said foot comprises:
  a) a lower structure 12 positioned on the bottom that maintains said elbow-type terminal bend 11 of said pipeline resting on the bottom 10 and a first part $12_1$ of a so-called connection element 12 in vertical position, turned upwards at the extremity of said curvature and
  b) an upper structure 14-18 that assures guidance of said terminal portion $5_1$ of said vertical riser that it maintains in vertical position and that cooperates with said lower structure 13 in such a fashion that said upper structure 14-18 is positioned above said lower structure 13 in such a fashion as to guide a second part $12_2$ of said connection element 12 situated at the lower extremity of said terminal portion $5_1$ of said vertical riser opposite to said first complementary part $12_1$ of said second part $12_2$ of said connection element 12 and in such a fashion as to stabilize said lower structure 13 positioned on the bottom in virtue of the weight of said upper part 14-18. The lower structure 13 is a light pedestal-type metal structure which is integrated at the elbow-type extremity of said pipeline resting on the bottom of the sea 10. FIG. 2 represents one of two complementary parts of the connection element 12; that is, a male part $12_1$ capable of connecting to a female part $12_2$ of the lower extremity of said terminal portion $5_1$ of the vertical riser 5 (FIG. 4).

The principle of the automatic connectors 12 being known to the specialist in the art in the field of hydraulics and pneumatics will not be described in detail herein. This mode of connection has the advantage of being entirely reversible, insofar as the automatic connector is designed to be able to be disconnected. It is thus possible, in the course of exploitation, to perform service on a single riser for dismantling it and replacing it without disturbing the rest of production and thus without having to shut down production of adjacent risers.

In FIG. 2, said upper structure 14-18 comprises more specifically:
  a main structure 14 and stabilizing anchoring blocks 17, that are positioned on the main structure 14,
  said main structure 14 in the form of a hat, comprises:
  a central structure $14_1$ in elevation geometrically externally cylindrical in square or cylindrical cross-section and closing off an interior cavity 21 open at the base of said central structure, said cavity 21 having a flared shape enlarging towards the base and complementary to the pyramidal external shape of said lower structure 13 in such fashion as to cap said latter. Said central structure $14_1$ comprises an upper opening (20) traversed by said terminal portion $5_1$ of said vertical riser 5, the latter being blocked in said opening 20 communicating with said interior cavity 21 and
  a lower peripheral horizontal platform $14_2$ at the base of said central structure 14 and surrounding same, on which said anchor blocks $17_1$ are placed.

Said lower structure 13 is a hollow pyramidal pedestal-type structure truncated at its top and laterally transversed at its base by the terminal part bend 11 of the pipeline resting on the bottom 10, which opens at its top onto the flat part $13_1$ on which the male part $12_1$ of the connection element 12 at the extremity of the pipeline 10 rests.

In FIG. 4, the base $14_2$ comprises in the rightmost part of the drawing, vanes $14_3$ taking up the pressure forces due to the dilation of the pipeline 10 as well as an anchor block type stabilization element $17_1$.

In fact, the pipeline resting on the bottom of the sea is substantially in alignment up to the foot of the tower; that is, up to the foot structure. Variations in temperature bring about forces internal to the pipeline that create a horizontal pressure on the foot parallel to the axis of said pipeline that can reach several tens of tons. These vanes $14_3$ are disposed preferably perpendicular to the axis of the pipeline and penetrate deeply into the floor in such a fashion as to contain these pressure forces and prevent any displacement of said foot. For the sake of clarity in the description of the base in the various other figures, said vanes $14_3$ have not been shown.

In the case of a foot stabilized by a suction anchor $17_2$ the design itself of the suction anchor $17_2$ is well adapted to absorbing such forces. In the leftmost part of FIG. 4 a suction anchor $17_2$ is represented imbedded through an opening $37_0$ in the platform $14_2$. The suction anchors $17_2$ have channels in the form of a large diameter bell and generally elongated, having on the lower face an open opening and on the upper face a leakproof plug $37_1$. The anchor $17_2$ is lowered by means of a crane lug $37_2$ until penetrating the floor. A ROV (not shown) then connects on the opening $37_3$ and, with the aid of a pump, applies suction to the interior of the bell. The resulting force tends to cause the suction anchor to penetrate into the sea floor until the shoulder $37_4$ abuts on the platform $14_2$ of the foot structure and-so stabilizes. This type of anchor $17_2$ can measure several meters in diameter and 10 to 30 m in height, or more. They can weigh from 15 to 50 tons each, or more.

Figure 5A:
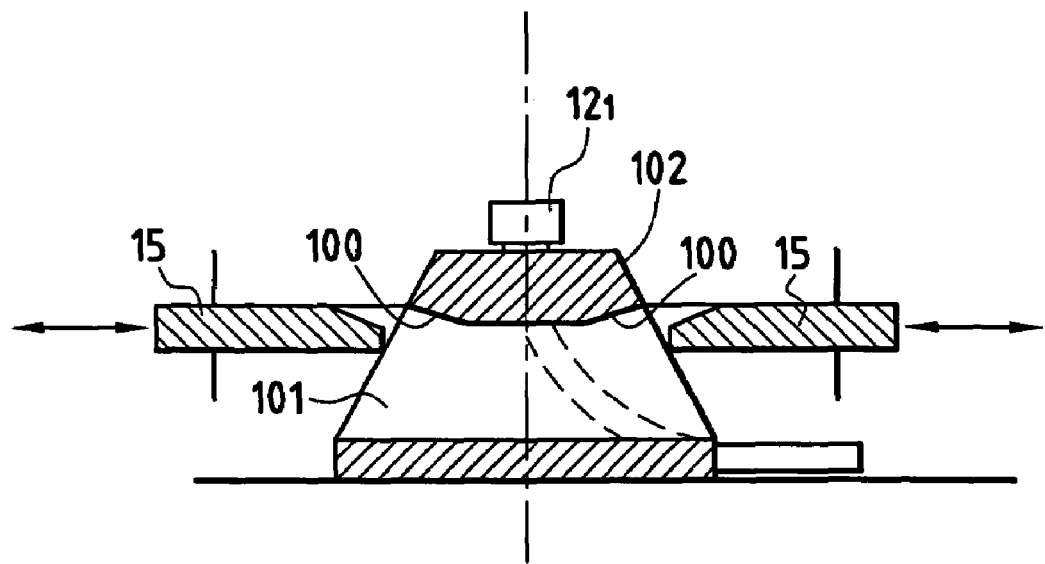
FIGS. 5A and 5B are views in section respectively of the side (FIG. 5A) and the face (5B) of a lower structure having a pedestal type pyramidal structure.

In FIGS. 3A, 4 and 5A said lower structure 13 is secured by said upper structure 14-18 by a system of wedges 15.

Figure 5B:
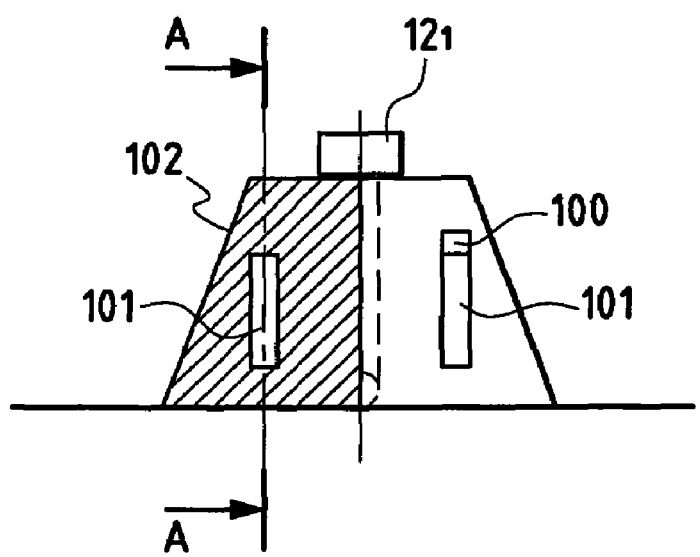

FIGS. 5A and 5B are cross-sectional views, respectively, of the side and face of the pedestal-type structure 13. In FIG. 5A the cross-section corresponds to a slice along the axis AA and details the faces 100 of said pedestal 13 cooperating with the hereinbefore described wedges 15. Said wedges 15 (not shown in FIG. 5B) have a length corresponding to the width of an opening 101 in the pedestal structure 13. The pedestal 13 is represented with an identical counterpart in the main structure 14 in such a fashion that the pedestal assembly 13 plus the structure 14 form only one, once the wedges 15 are locked.

In FIG. 6 an installation is represented, which comprises:
  at least two so-called vertical risers 5a, 5b substantially parallel and in proximity, each being connected at its upper extremity to at least one float 30a, 30b and said foot 14-18 maintaining them in fixed vertical position and connecting them to each other by means of said connection elements 12:

on the one hand two so-called terminal portions of the pipeline $5_1$ of said vertical risers and on the other hand, respectively, two so-called elbow-type terminal bends 11 of two so-called sub-marine pipelines resting on the bottom 10, these being turned facing upwards.

two so-called lower structures 13a, 13b positioned on the bottom, each holding in vertical position, turned upwards one so-called terminal bend 12 of a so-called sub-marine pipeline $10_1$, $10_2$ resting on the sea bottom and a first part $12_1$ of a so-called connection element 12 at the extremity of said bend 11 and a co-called upper structure 14-21 that assures guidance of the two so-called terminal portions $5_1$ of said vertical risers 5a, 5b and maintaining them in vertical position and that cooperate with the two so-called lower structures 13a, 13b in such a fashion that said upper structure 14-21 is positioned over and caps two so-called lower structures 13a, 13b side-by-side in such a fashion as to guide a so-called second part $12_2$ of said connection element 12 situated at the lower extremity of said terminal portion $5_1$ of each of said vertical risers opposite to said first part $12_1$ of said connection element 12 at the extremity of said bend of each of said pipelines $10_1$, $10_2$ resting on the sea bottom and stabilizing said lower structures 12 positioned on the sea bottom in virtue of the weight of said upper structure 14-21.

Said upper structure comprises a main structure 14 comprising two lower cavities 21 opened at the base and each having towards the bottom a flanged shape complementary to the external pyramidal shape of one so-called lower structure 13a, 13b and capable of capping it and two so-called upper openings 20 each communicating with a so-called lower cavity 21, each of said upper openings 20 being traversed by said terminal portions $5_1$ of said vertical risers 5a, 5b, these latter being centered and blocked in said upper openings 20 by said second system of wedges 18.

In FIGS. 6 and 7, said vertical riser 5 comprises in its upper part over said flexible joint 19 a system of pipes comprised of a pipe-in-pipe type thermal insulating system comprising an assembly of two coaxial pipelines comprising an internal pipeline $5_2$ and an external pipeline $5_3$, an insulating fluid or insulating material $5_4$ comprised, for example, of paraffin, being placed preferably between the two so-called conduits $5_2$, $5_3$.

In FIGS. 6 and 8, the two so-called sub-marine conduits $10_1$, $10_2$ resting on the sea bottom are assembled in a bundle in the same encircling flexible protective envelope $10_3$ making it possible to contain an insulating material $10_2$, preferably comprised of paraffin, surrounding said conduits.

In FIG. 4, all of the constituent elements of the base of the tower are in final configuration, the overall geometry of the assembly no longer able to move, except in the vertical part of the riser situated above the flexible joint 19.

FIG. 6 represents the lower part of a tower similar to that of FIG. 5, comprising tow vertical risers 5a, 5b connected to two independent pipelines $10_1$, $10_2$. The risers are installed in parallel according to the procedure hereinbefore described.

Figure 9:
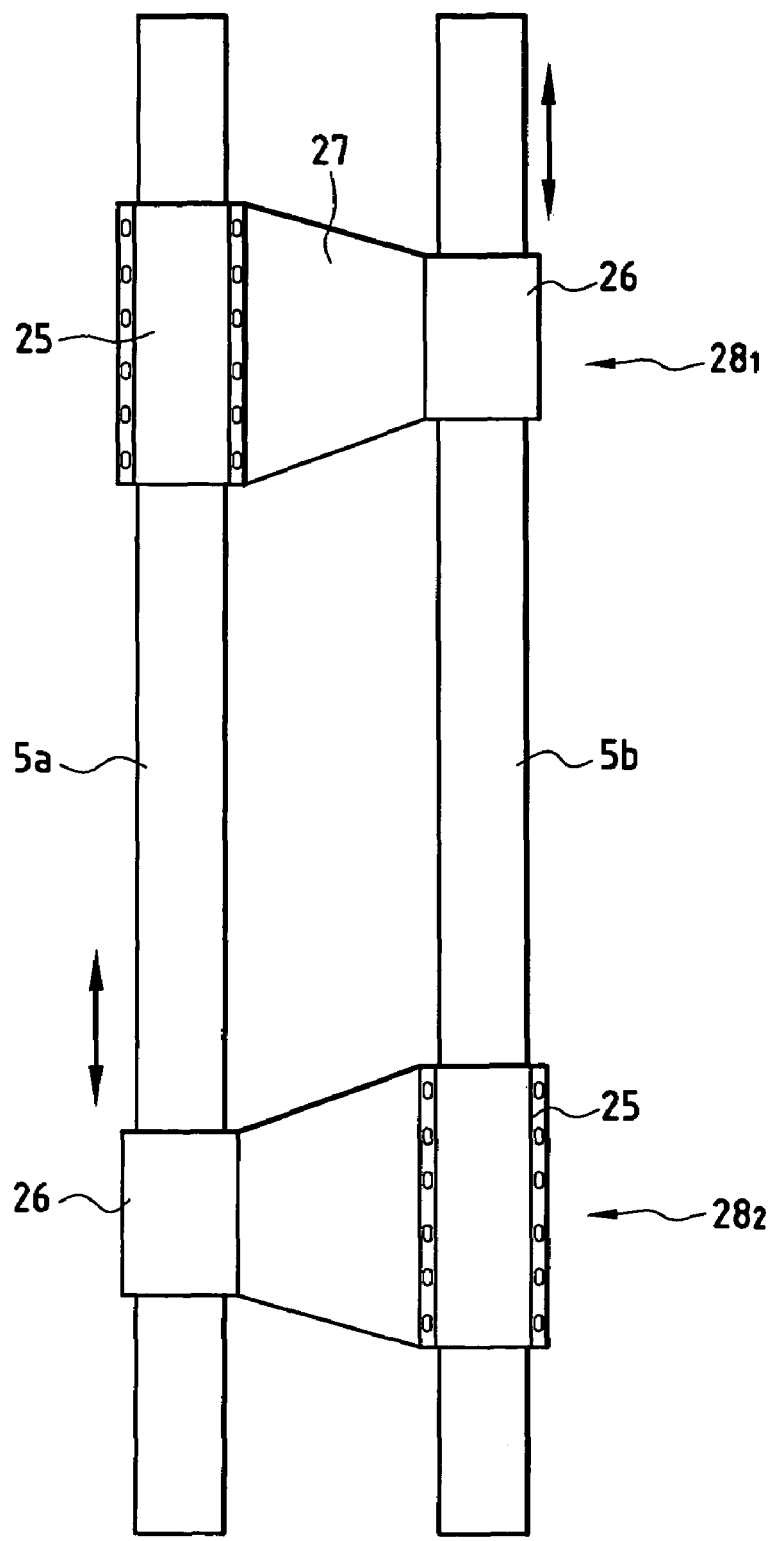
FIG. 9 is a side view of two vertical risers secured by connection means and sliding guide means.

FIG. 9 details a preferred manner for permitting the axial displacements of one of the risers 5a, 5b relative to the other in such a fashion that the differential dilation between risers can be released and not induce unacceptable stresses that risk damaging or even destroying the tower. The device according to the invention is comprised of a tubular collar 25 firmly fixed on the riser 5a and rigidly connected on 27 to a tubular ring 26 freely sliding on the riser 5b. The collars are disposed along the length of the risers, whether or not in regular intervals, and preferably installed in opposition as represented in the same figure. Thus, the two risers being secured to the foot at the level of the flexible joints 19, if only the riser 5a is at temperature the sliding rings 26 allow expansion of said riser 5a and the quasi-integrality of the expansion is at the head of the vertical riser, at the level of the gooseneck as indicated in FIG. 10.

Figure 10:
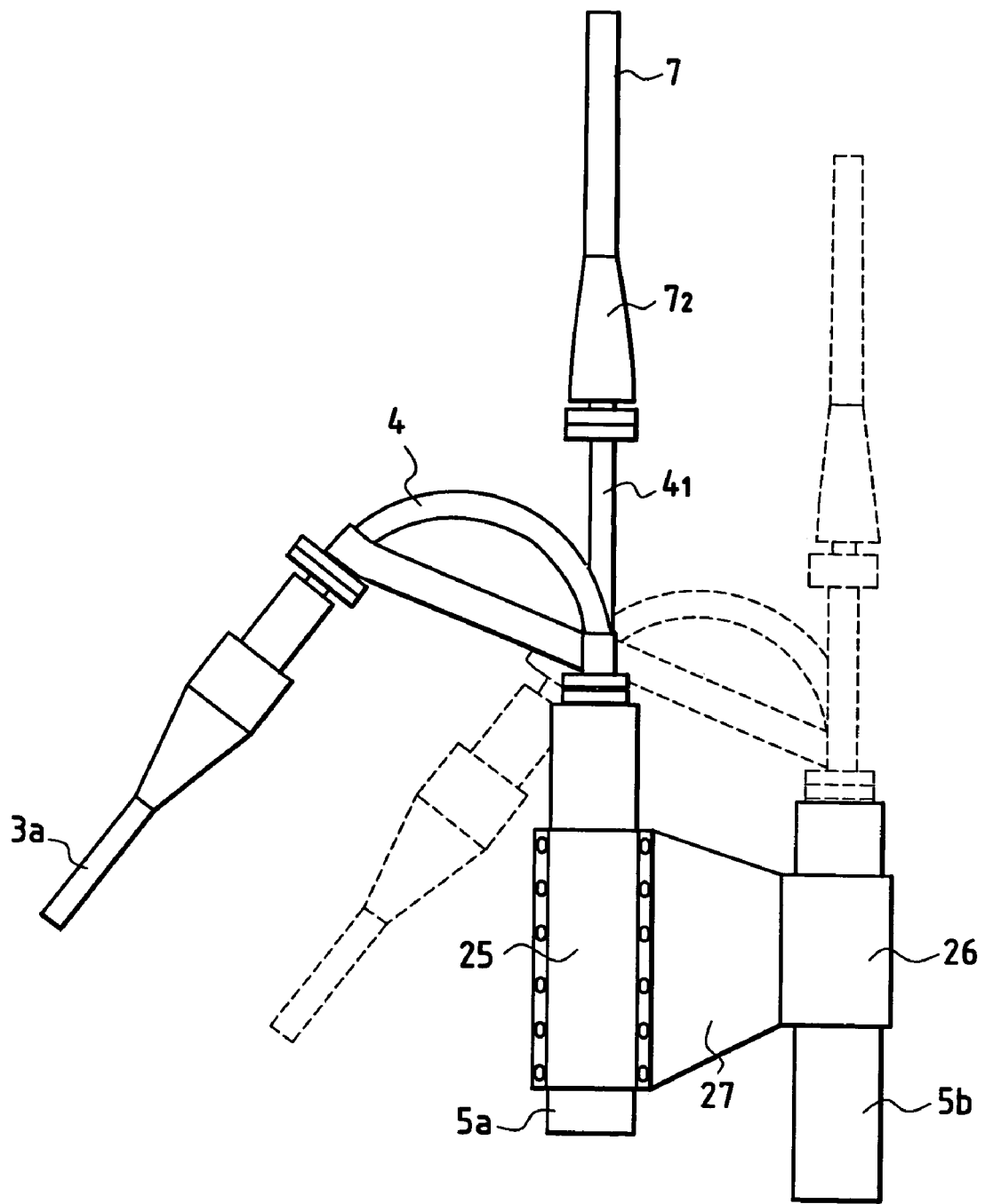
FIG. 10 represents a side view of the upper extremity of the vertical risers with a gooseneck type device enabling their connection on the one hand to the floating support by means of a flexible pipe and on the other hand to the floats.

In FIG. 10, the installation comprises a linking device 4, 7 between said float 6 and the upper end of said riser 5, comprising:

a second flexible pipeline 7 the extremity of which are embedded respectively at the underside of said float 6 and the upper end of riser 5 a second flexible pipeline 7 at the upper extremity of said riser 5 formed by means of a gooseneck device 4, said gooseneck device 4 assures also the connection between said riser 5 and a so-called flexible conduit 3 with the floating support;

said second flexible pipeline 7 being extended through said float 6 by a rigid tubular conduit 8 crossing the float from one side to the other so that access is possible to the interior of said vertical riser 5 from the upper part of the float 6 through said rigid tubular conduit 8, then said connection device comprised of said second flexible pipeline is through said gooseneck device 4, so as to access the interior of said riser 5 and clean it by injection of liquid and/or by scraping the inside wall of said riser (5), then that of said sub-marine pipeline 10 resting on the sea bottom.

Said second flexible pipeline 7 has at its extremities progressive inertial variation elements in section $7_1$, $7_2$ at the level, respectively, of the underface of the float 6 and the upper extremity 41 of the gooseneck.

Figure 11:
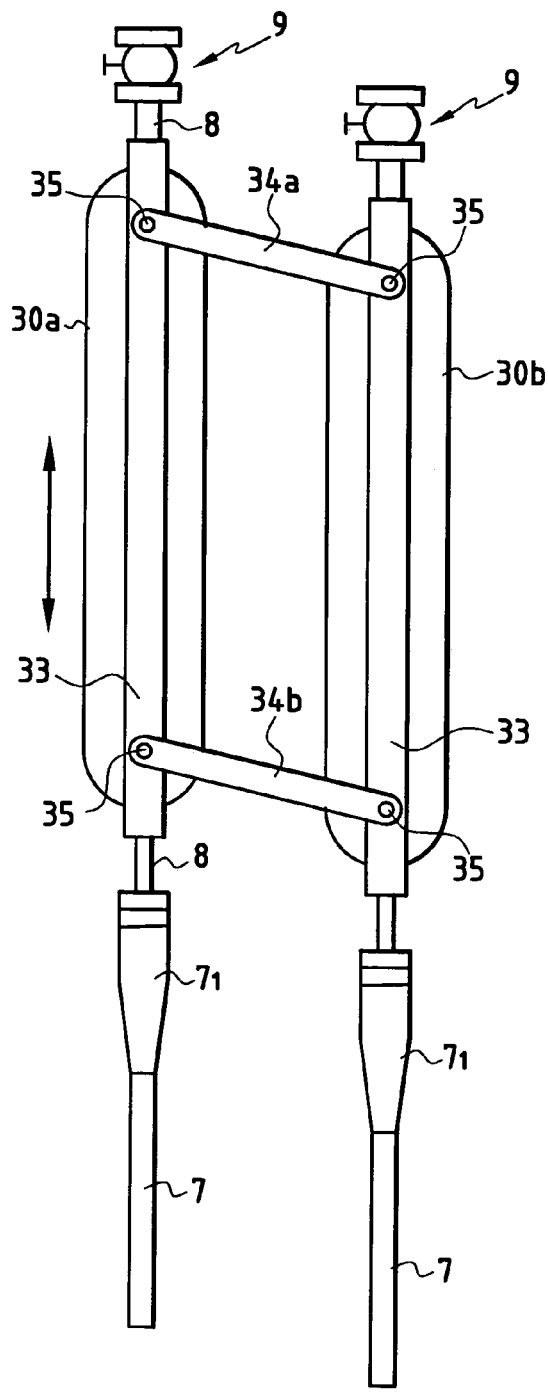

In FIG. 11, the installation according to the invention comprises two groups each comprising a plurality of floats 30a, 30b at the top of the at least two so-called vertical risers $5_a$, 5b. Said floats 30a, 30b of a same so-called group are maintained secured and fixed relative to each other by means of a rigid structure in the form of a rectangular frame comprised of two parallel vertical bars 33 and two parallel transverse bars 36 securing and supporting them. The two rectangular frames of the two groups of floats 30a, 30b are connected to each other by two articulated frames in the form of a parallelogram on each side, each comprised of two parallel, substantially vertical bars 33 and connected at their extremities by articulations 35 to the extremities of the upper 34a and lower 34b parallel transverse bars.

The assembly formed in deformable parallelepiped by vertical translation of said rectangular frames relative to each other, authorizes relative vertical displacements of each of said float groups relative to the other, brought about in particular by differential dilation.

Figure 12:
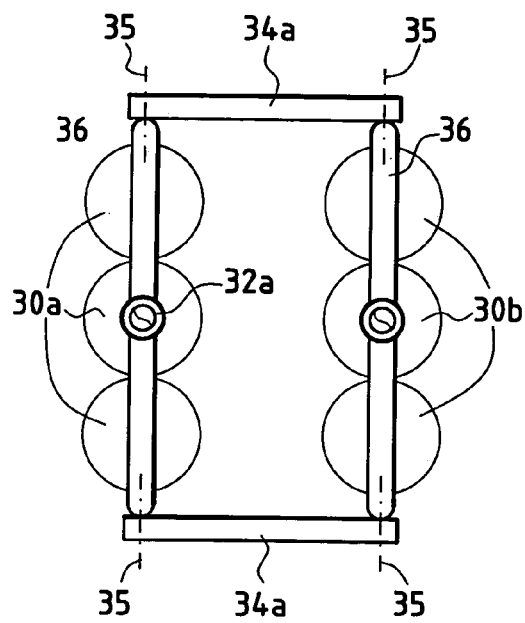
FIGS. 11 and 12 represent, respectively, side and top views of floats situated in direct continuity with the vertical risers.

As shown in detail in FIGS. 11 and 12, the structure supports a group of three floats 30a, whose central float is traversed by a pipeline 8 in continuation of the flexible pipe 7 and opening at the upper part of said float over a leakproof opening 9; for example, a spherical gate valve. Thus, all of the maintenance operations on the riser and on a large part of the pipeline resting on the sea bottom are done advantageously from a surface vessel 10 installed on the vertical plane of said access valve 32a; the coil tubing operation being possible in the part of the tube resting on the sea bottom, on condition that the radius of curvature of the bend situated in the boot is sufficiently large, for example 5 m, or even 7 m or more.

In FIG. 10, the riser 5b, being cold, is shorter than the riser 5a, which is at a higher temperature. Likewise, in FIG. 11, the float group 30b is offset downwards substantially by the same distance. The two float groups 30a, 30b are maintained substantially at the same distance by means of the structures in parallelogram forming deformable parallelepipeds vertically, authorize the vertical displacements brought about, for example, by the differential dilation of the two risers 5a, 5b, the one being hot 30a and the other being at the temperature of the sea water; that is, cold.

The connection means of the floats have been described by means of bars 33, 34 articulated at the level of the axes 35, but being quite capable also of being realized by deformable elements, for example elements made of elastomers, it being understood that the result sought is to maintain at a substantially constant distance the two float groups 30a-30b in order to prevent them from clashing against each other as the result of swell and current, whilst allowing relative movements in a direction corresponding substantially to the axis of the vertical pipelines.

In the same way, in FIG. 9, it is within the scope of the invention if the sliding collars 25 and rings 26 are used to guide the two vertical risers in the running part by articulated bars similar to those hereinbefore described for guiding the floats 30.

The vertical riser 5 can be either prefabricated on the mainland and then towed to the site or fabricated directly on the site shortly before installation. It is comprised of a running riser portion 5 at the lower extremity of which a flexible joint 19 is installed connected to a portion of reinforced riser $5_1$, itself secured to the second part $12_2$ of the automatic connector. The internal passage of the flexible joint 19 as well as the portion of the reinforced riser $5_1$ have an inside diameter that is preferably identical to that of the riser 5. Said portion of the riser $5_1$ is reinforced in order to assure rigidity of the assembly once the wedges 18 are locked into their final position. Said reinforcement results either from a simple increase in the thickness of the wall or by the addition of external stiffeners or from the combination of the two or by any other means intended to provide the assembly with increased strength and rigidity.

In the method for implementation of the installation according to the invention, the steps are carried out, wherein:

1- at least one so-called sub-marine pipeline 10 is installed on the sea bottom, whose terminal portion has a elbow-type bend 11 and is secured to said lower structure 13, which is preferably previously installed on the surface and at the extremity of which a male $12_1$ or a female $12_2$ part of a so-called connection element 12 is affixed and 2- a so-called main structure 14 is lowered over said lower structure 13 and preferably is blocked mechanically, more preferably still using a system of wedges 15 actuated, for example, by hydraulic actuators, said lower structure 13 at the interior of said cavity 21 of said main structure 14 that thus form a highly rigid assembly;

3- said main structure 14 is stabilized by lowering anchorage blocks $17_1$ from the surface over a so-called peripheral platform $14_2$ resting on the sea bottom, this placement is done under ROV control;

4- at least one so-called vertical riser 5a, 5b is lowered through at least one so-called upper opening 20 of said upper structure 14, then the lower extremity of said portion of the riser $5_1$ engaged in said upper opening 20 comprising a so-called complementary part, respectively female $12_2$ or male $12_1$ of a so-called connection element 12, in such a fashion as to realize said connection between the two complementary parts $12_1$, $12_2$ of said connection element 12, then 5- after approximation of the complementary parts of said connection element 12, said connection is made, and 6- blockage of said portion of the terminal pipeline $5_1$ to the lower extremity of said vertical riser is made between said connection element 12 and said flexible joint 19 in said upper opening 20 with the aid of a system of wedges 18. In order to do this, the wedges 18, which will block the lower part $5_1$ of the riser situated between the connector 12 and a flexible joint comprised of an articulated abutment with integral passage 19. The wedges 18, represented in FIGS. 3a and 3b in retracted position on the right and in the engaged position on the left, are actioned by a ROV by means of hydraulic actuators (not shown).

In an embodiment of the invention comprising at least two vertical risers 5a, 5b, they are installed independently of each other and they are maintained substantially parallel in the same plane over the entire height by collars 25 and sliding rings 26 or by any other means allowing release of the translations in a direction parallel to the axis of said risers.

Figure 13:
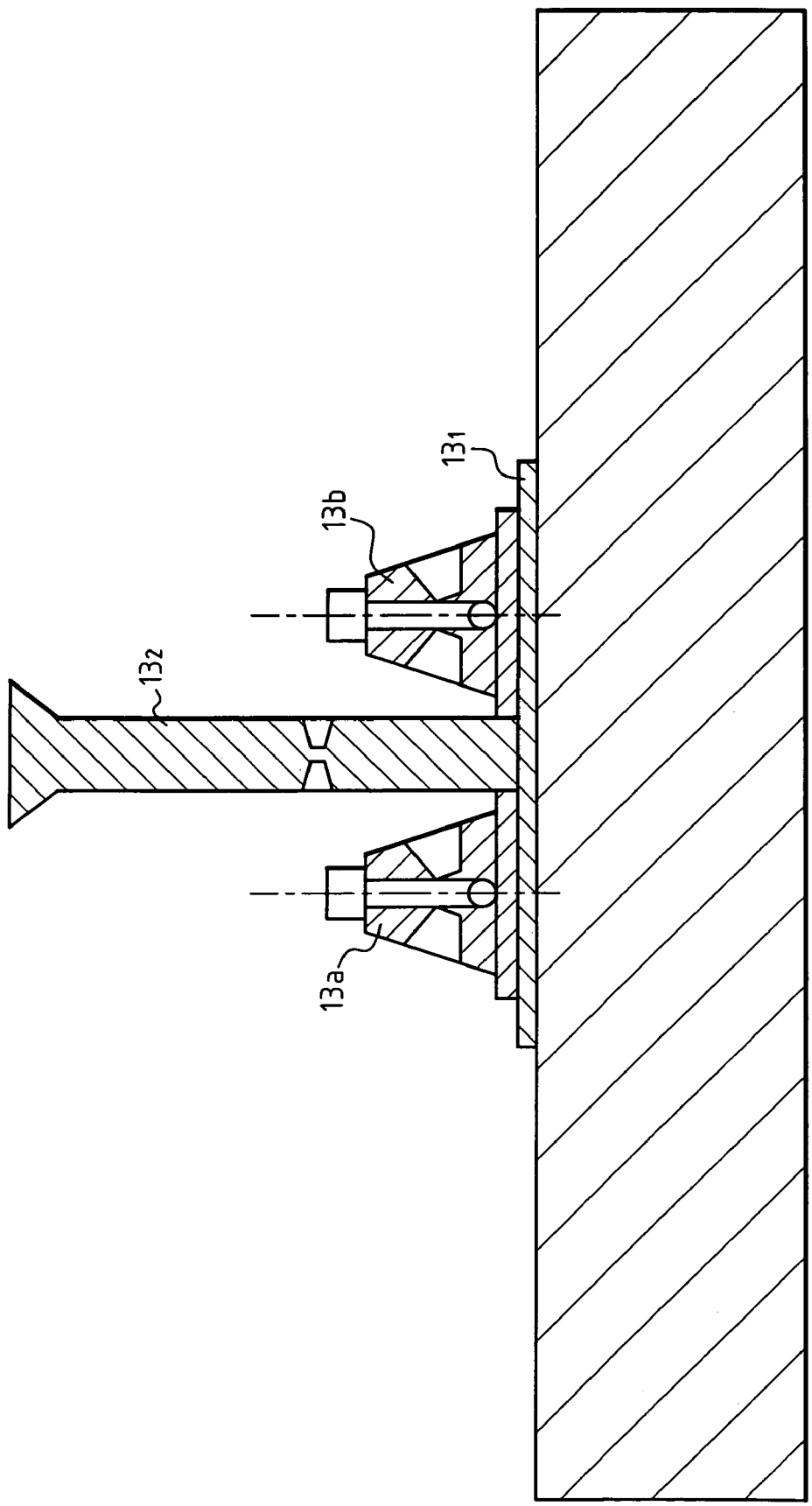
FIGS. 13 and 14 represent an embodiment with a second platform surmounted by a central vertical guiding element.

In FIG. 13, a second platform $13_1$ is represented on which two pedestal-type structures 13a, 13b are disposed on either side of a central vertical element $13_2$ surmounting said second platform 131 at its center.

Figure 14:
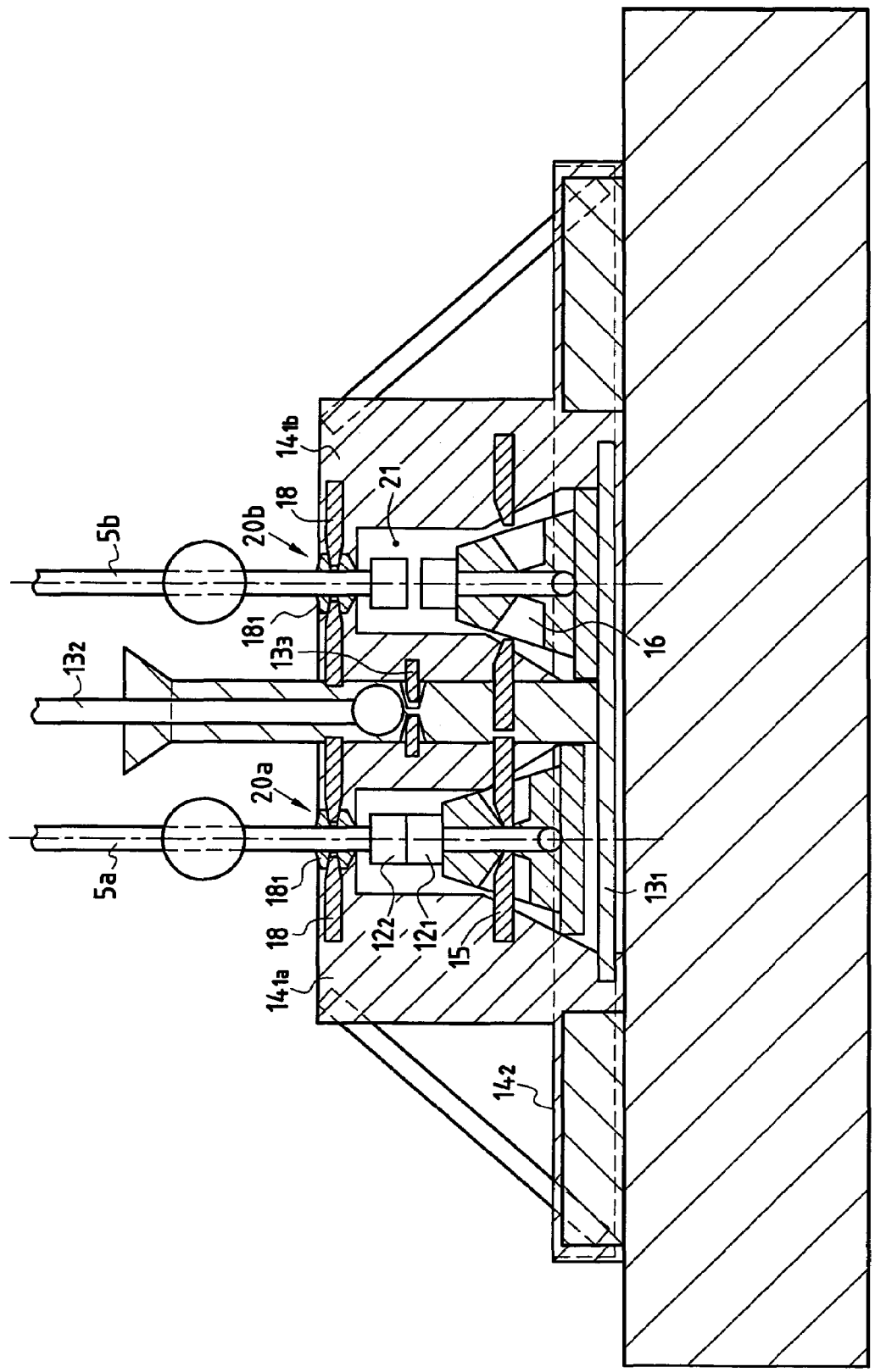

As represented in FIG. 14, said central vertical element $13_2$ is used as guidance of the vertical risers 5a,. 5b in their descent in order that they arrive opposite the openings 20a, 20b of the two central structures in elevation $14_{1a}$ and $14_{1b}$.

In the installation sequence, the steps are carried out, wherein:

1) said second platform $13_1$, is lowered;

2) said pedestal-type structures 13a and 13b are lowered over said platform 13, these latter being installed at the extremity of the pipelines 10 resting on the sea bottom.

3) said central structures in elevation $14_{1a}$ and $14_{1b}$ are lowered over said pedestal-type structures 13a and 13b, so as to cover them;

4) said structures in elevation $14_{1a}$ and $14_{1b}$ are mechanically blocked using a system of wedges $13_3$ that cooperates with the central vertical element $13_2$;

5) the vertical risers 5a, 5b are lowered along the central vertical element $13_2$ so as to arrive opposite the openings 20a, 20b in the upper part of said central structures in elevation $14_{1a}$ and $14_{1b}$;

6) the lower extremity $5_1$ of said vertical risers is mechanically blocked at the interior of said openings 20a, 20b using a system of wedges 18 and second counterparts $18_1$ placed in the lower terminal portion $5_1$ of said vertical risers $5_1$;

7) said pedestal-type lower structures 13a, 13b are mechanically blocked in said lower cavities 21 of said central structures in elevation $14_{1a}$ and $14_{1b}$ using a system of wedges 15. Said pedestal-type lower structures 13a and 13b comprise the first counterparts 16 that make possible raising said pedestal-type lower structure 13a, when the wedges 15 enter into action to block the pedestal-type lower structures 13a and 13b, which makes possible locking the first part $12_1$ of a connection element then at the top of said lower structure 13a and the complementary part of said connection element $12_2$ at the lower terminal portion $5_1$ of the vertical riser 5a.

It is understood that the locking of the connection element $12_1$, $12_2$ by elevation of the lower structure 13, is made possible by the combination of the following features:

1) the shape of the wedges 15 and the first counterparts 16 of the lower structure 13 that induce a distance of elevation of said lower structure when the wedges 15 cooperate with the first counterpart, and 2) the placement of the second counterparts $18_1$ in the terminal position $5_1$ of the riser and the heights of the interior cavity 21 and the pedestal-type structure 13 that command an initial spacing of the two complementary parts 12₁, 12₂ of the connection element, concur with said elevation distance.

In FIG. 14, on the right of the drawing, the position of the lower structure 13b prior to locking using the system of wedges 15 is represented. And, at the left of the drawing, the lower structure 13a is represented in elevation relative to said second platform 13₁ after locking using the system of wedges 15 and locking of the automatic connector 12₁, 12₂.

In this preferred embodiment, the mechanical blockage using the system of wedges 15 of said lower structure 13 at the interior of said cavity 21 of said upper structure 14, is done after the final step.

The invention claimed is:

1. A bottom-to-surface connection installation for a sub-marine pipeline resting on the sea bottom, the sub-marine pipeline having a terminal part with an upwards-facing terminal elbow bend, the installation comprising:
   a first vertical riser connected at its lower extremity to the sub-marine pipeline and at its upper extremity to at least one float, said at least one float exerting an upward vertical traction on said first vertical riser, said upper extremity of said vertical riser and said float being capable of being subjected to displacements due to swell and current;
   a linking pipeline assuring a connection between a floating support and said upper extremity of said first vertical riser; and
   an anchoring system comprising a foot positioned on the sea bottom to connect said lower extremity of said vertical riser and the sub-marine pipeline;
   wherein said lower extremity of said first vertical riser includes a terminal pipe portion connected to an upper part of said first vertical riser by a flexible joint which permits angular movements of said upper part relative to said terminal pipe portion;
   wherein said lower extremity of said first vertical riser is connected to an upper extremity of the terminal elbow bend of the sub-marine pipeline by a single connection element between said first vertical riser and the sub-marine pipeline; and
   wherein said terminal pipe portion of said first vertical riser and the terminal elbow bend of the sub-marine pipeline are connected to each other by said single connection element which is rigidly maintained by said foot, and wherein said foot rigidly maintains said terminal pipe portion of said first vertical riser in a vertical fixed position and said terminal elbow bend of said sub-marine pipeline in a fixed position.

2. The installation according to claim 1, wherein:
   said connection element comprises a first part connected at the extremity of said terminal elbow bend and a second part connected at the lower extremity of said terminal portion of said first vertical riser, said second part being complementary to said first part, and wherein said foot comprises,
   a lower structure positioned on the sea bottom that maintains in a vertical position turned upwards said terminal elbow bend of said pipeline and said first part of said connection element, and
   an upper structure that assures guidance of said terminal portion of said first vertical riser and that maintains in a vertical position and that cooperates with said lower structure in such a fashion that said upper structure is positioned over said lower structure so as to guide a second part of said connection element, and
   stabilize said lower structure positioned on the sea bottom, by virtue of the weight of said upper structure.

3. The installation according to claim 2, wherein said lower structure is secured to said upper structure by a first system of wedges.

4. The installation according to claim 3, wherein said upper structure comprises:
   a main structure; and
   stabilization elements that cooperate with said main structure for stabilizing said main structure on the sea bottom;
   said main structure comprising
      a central elevated structure capping said lower structure and comprising
         an interior cavity open at its base and having a flared shape complementary to the external shape of said lower structure such that said central structure caps said lower structure,
         an upper opening crossed by said terminal portion of said vertical riser, said terminal portion being blocked in said upper opening by a second system of wedges, said upper opening communicating with said interior cavity, and
      a lower peripheral horizontal platform at the base of said central structure and with which said stabilization elements cooperate.

5. The installation according to claim 4, wherein said stabilization elements comprise vanes disposed under said platform that imbed vertically in the sea bottom, anchorage blocks positioned over said platform and suction anchors positioned over said platform and passing through said platform in order to be imbedded in the sea bottom.

6. The installation according to claim 1, further comprising a connection device between said float and the upper extremity of said first vertical riser, said connection device comprising:
   a flexible pipe, whose extremities are enclosed at the level, respectively, of the sub-face of said float and the upper extremity of said first vertical riser;
   the connection of said flexible pipe at the upper extremity of said riser being formed by means of a gooseneck device, which gooseneck device also assures the connection between said riser and a connection pipe with the floating support.

7. The installation according to claim 1, further comprising:
   a second vertical riser substantially parallel to and approximately the same size as said first vertical riser each of said first and second vertical risers being connected at its upper extremity to at least one float, and
   said foot being in a fixed vertical position and connecting said first and second vertical risers to each other by means of said connection elements, said foot being connected
   on the one hand to two said terminal pipe portions of said vertical risers, and
   on the other hand, respectively, to two terminal elbow bends of two sub-marine pipelines, the terminal elbow bends of the sub-marine pipelines being turned upwards.

8. The installation according to claim 7, wherein said foot comprises:
   at least two lower structures positioned on the sea bottom, each holding in vertical position, turned facing upwards a terminal elbow bend of a respective sub-marine pipeline and a first part of a respective connection element at the extremity of said terminal elbow bend, and
   an upper structure that assures guidance of the terminal pipe portions of said first and second vertical risers and holding them in a vertical position and that cooperates with said at least two lower structures, in such a fashion that said upper structure is positioned over said at least two lower structures side-by-side so as to guide said second part of said connection element situated at the lower extremity of said terminal portion of each of said first and second vertical risers opposite to said first part of said connection element at the extremity of said terminal elbow bend of each of the sub-marine pipelines and stabilizing said lower structures positioned on the sea bottom by virtue of the weight of said upper structure.

9. The installation according to claim 8, wherein said upper structure comprises a main structure having at least two interior cavities each complementary in shape to the outer shape of lower structure and capping said lower structure, and at least two upper openings each communicating with a respective interior cavity, each of said upper openings being crossed by a respective terminal portion of one of said first and second vertical risers, said terminal portion being blocked in said upper opening by a system of wedges.

10. The installation according to claim 9, wherein said upper structure comprises a main structure that comprises:
at least two central structures in elevation cooperating with a horizontal platform on which at least two lower structures rest;
said horizontal platform being surmounted by a central vertical element that makes possible
guiding of said vertical risers relative to said upper openings of each of said central structures in elevation.

11. The installation according to claim 1, wherein the installation is for two sub-marine pipelines that are assembled in a bundle in the same flexible protective envelope making possible confinement of an insulating material surrounding the sub-marine pipelines.

12. The installation according to claim 1, further comprising a second vertical riser substantially identical to said first vertical riser and
wherein said first and second vertical risers are held substantially parallel to the middle of a sliding connection system allowing axial displacement of said first vertical riser relative to said second vertical riser, said connection system comprising a tubular collar fixed around said first vertical riser, said collar being rigidly connected to a tubular ring freely sliding around said second vertical riser.

13. The installation according to claim 12
wherein said sliding connection system comprises respective pluralities of tubular collars and tubular rings, said tubular collars and tubular rings being arranged in alternation on a single vertical riser.

14. The installation according to claim 1, further comprising at least one float at the top of said first vertical riser, said at least one float at the top of said vertical riser being secured by means of a supporting structure that allows vertical displacements of said float.

15. The installation according to claim 14, wherein said supporting structure comprises articulated structures formed as parallelograms deformable by vertical translation.

16. The installation according to claim 1, wherein said first vertical riser comprises in its upper part over said flexible joint a system of insulated pipes comprised of an assembly of two coaxial pipes comprising an internal pipe and an external pipe, with one of an insulating fluid, material, and a vacuum being placed between said two co-axial pipes.

17. The installation according to claim 1, wherein said linking pipeline is flexible.

18. The installation according to claim 1, wherein said terminal elbow bend has a radius of curvature of greater than about 5 m.

19. The installation according to claim 1, wherein said connection element is an automatic connector.

20. A method of placing an installation according to claim 1, comprising the steps of:
installing at least one sub-marine pipeline on the sea bottom, the sub-marine pipeline having the terminal part with the elbow bend turned upwards and at the extremity of which said single connection element is affixed;
lowering said foot that maintains said elbow bend turned upwards in position and stabilizes it on the sea bottom; and
lowering said first vertical riser through an opening in said foot, the lower extremity of said first vertical riser comprising a complementary part to said connection element so as to establish said connection between said complementary part and said connection element
wherein a blockage in said foot of said lower terminal portion of said first vertical riser is realized, and of said terminal part of the sub-marine pipeline.

21. The method according to claim 20, wherein:
at least one sub-marine pipeline is installed on the sea bottom, the elbow bend of which is secured by a single lower structure;
the method further comprising
lowering an upper structure over said lower structure until it is mechanically blocked, said lower structure being at the interior of an interior cavity of said upper structure;
stabilizing said upper structure by cooperation of said stabilization elements using the floor above a platform at the base of said upper structure resting on the sea bottom;
lowering at least one said first vertical riser through at least one upper opening of said upper structure then
establishing said connection between said complementary parts and said connection element; and
blocking said portion of the terminal pipe portion at the lower extremity of said first vertical riser between said connection element and said flexible joint, in said upper opening using a system of wedges.

22. The method according to claim 21, further comprising the step of blocking said lower structure at the interior of said interior cavity after said portion of the terminal pipe portion is blocked.

* * * * *